United States Patent [19]

Quantz

[11] 4,332,827
[45] Jun. 1, 1982

[54] METHOD OF CRACKING NUTS AT HIGH PRODUCTION RATES

[75] Inventor: James B. Quantz, Columbia, S.C.

[73] Assignee: Machine Design Incorporated, Columbia, S.C.

[21] Appl. No.: 199,743

[22] Filed: Oct. 23, 1980

[51] Int. Cl.³ .............................................. A23N 5/02
[52] U.S. Cl. .................................... 426/481; 99/574; 426/482
[58] Field of Search ................... 426/482, 481; 99/571, 99/574, 578, 577, 580, 581, 582

[56] References Cited

U.S. PATENT DOCUMENTS

| | | |
|---|---|---|
| 928,958 | 7/1909 | Gilson . |
| 1,160,376 | 11/1915 | Canale . |
| 1,208,324 | 12/1916 | Jones . |
| 1,342,691 | 6/1920 | Pape ................................. 426/482 |
| 1,470,247 | 10/1923 | Wilms . |
| 1,901,798 | 3/1933 | Boomer . |
| 2,067,566 | 1/1937 | Field ................................. 426/482 |
| 2,635,662 | 4/1953 | Doering et al. . |
| 2,903,134 | 9/1959 | Ashlock, Jr. . |
| 3,561,513 | 2/1971 | Lindsey . |
| 3,871,275 | 3/1975 | Quantz . |

Primary Examiner—Raymond N. Jones
Assistant Examiner—George C. Yeung
Attorney, Agent, or Firm—Bell, Seltzer, Park & Gibson

[57] ABSTRACT

A high production nutcracking method and apparatus is provided wherein the nuts are fed from a hopper on a feed conveyor, while being singularized and oriented in the hopper. The oriented nuts are thereafter advanced by the conveyor individually in succession to a cracking apparatus, which comprises a plurality of cracking units mounted on a rotatable turret. The rotating cracking units are cyclically controlled so as to clampingly engage and lift each oriented nut from the advancing conveyor, and so as to preserve its orientation. The nut is then cracked and thereafter released at separate spaced points along the circular path of travel of the cracking unit.

9 Claims, 11 Drawing Figures

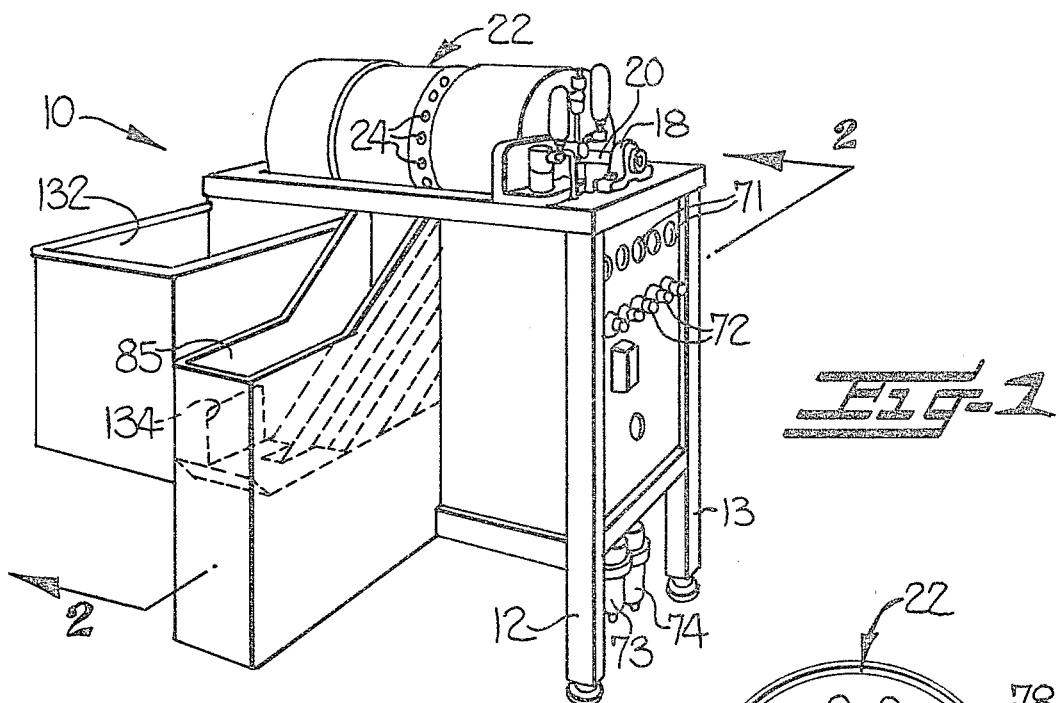
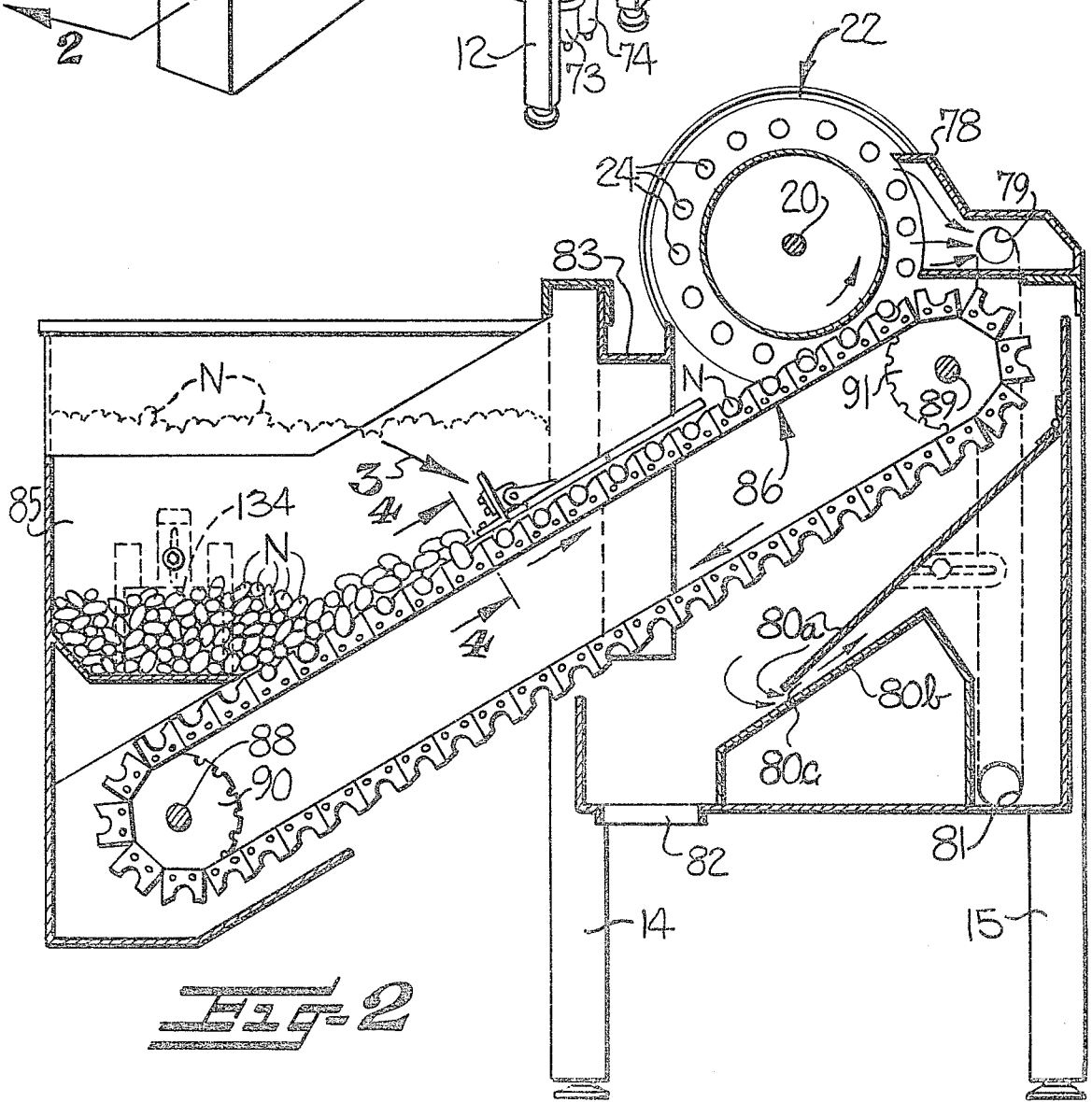

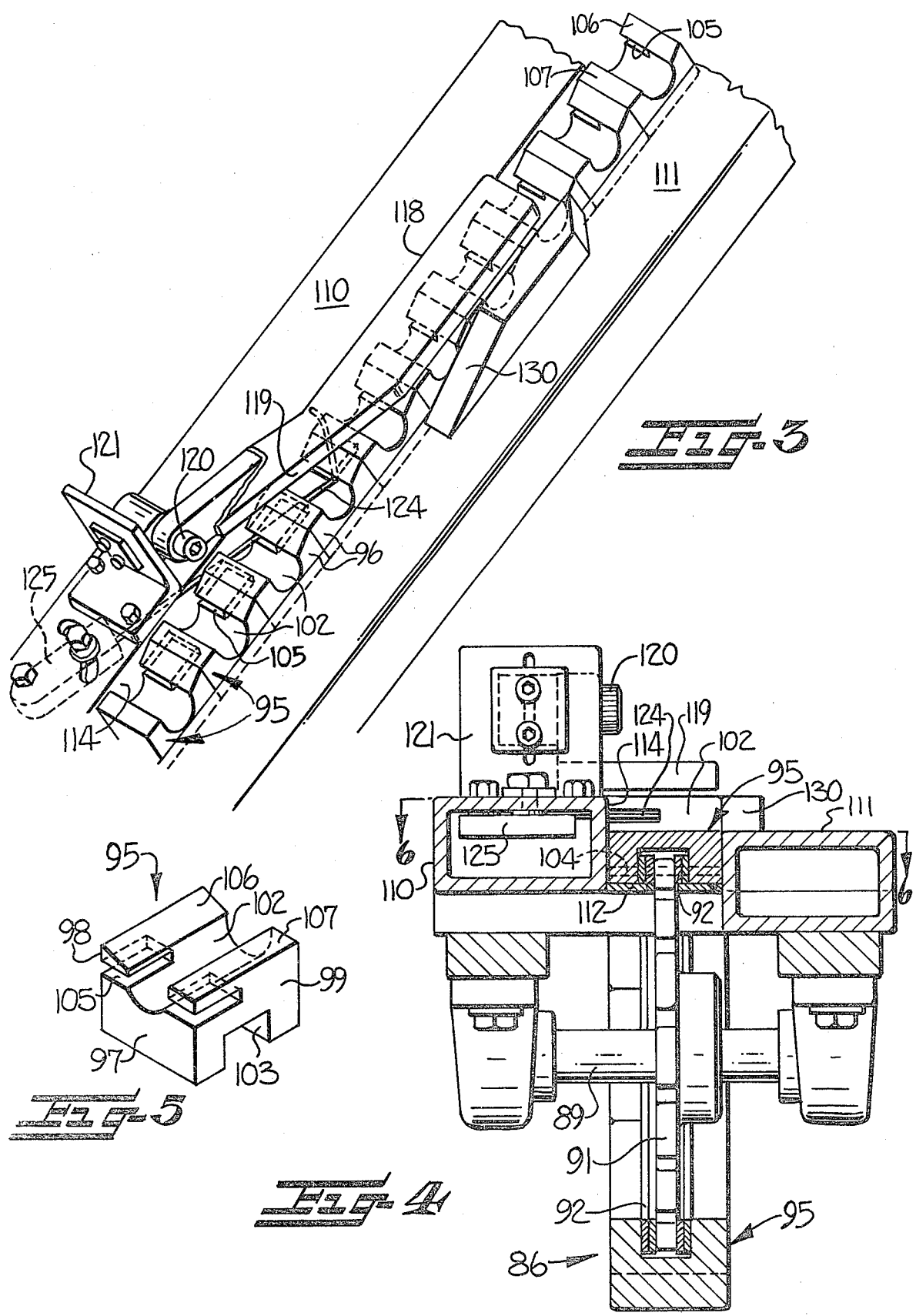

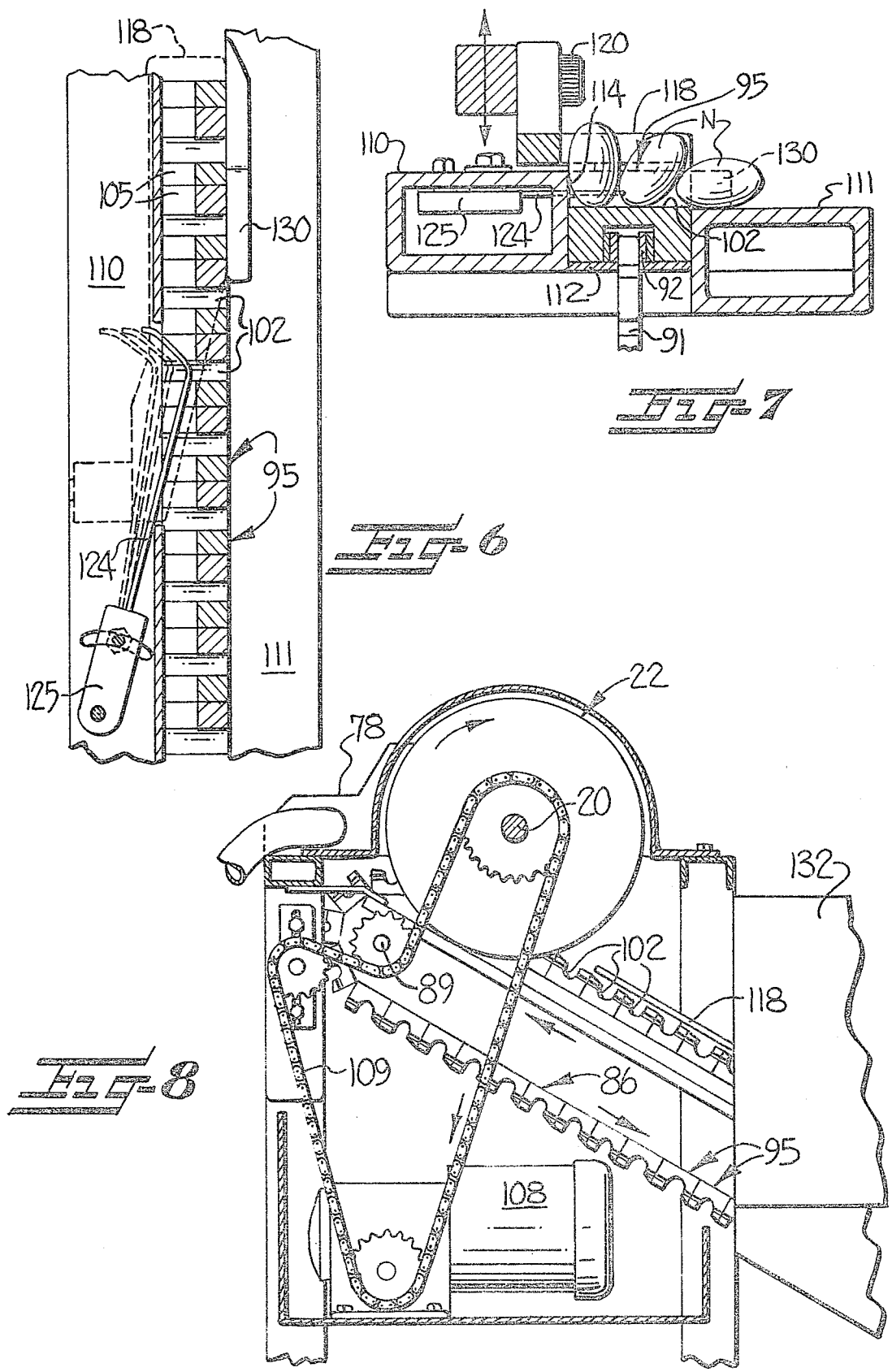

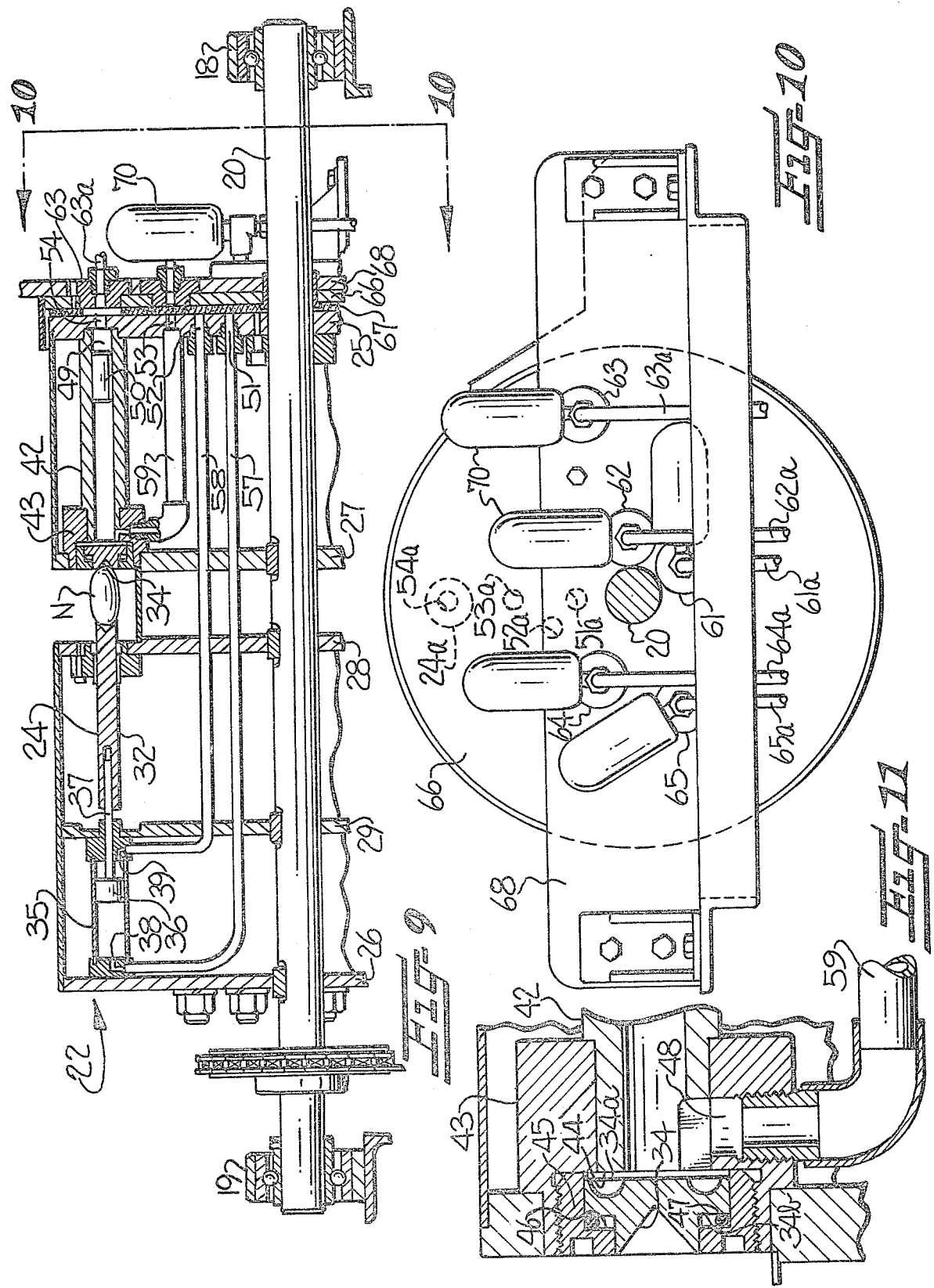

METHOD OF CRACKING NUTS AT HIGH PRODUCTION RATES

The present invention relates to an improved method and apparatus for cracking nuts at high production rates.

In applicant's prior U.S. Pat. No. 3,871,275, there is disclosed a high production nutcracking apparatus wherein a plurality of cracking units are arranged on a rotatable turret, with each cracking unit having an opening adapted to receive an individual nut which is dropped from a feed conveyor as the cracking unit moves through its top center position. Each cracking unit includes a mechanism for then cracking the nut as the turret continues to rotate, which is actuated by a pneumatic control system.

While the above nutcracking apparatus represents a significant advance in the art, its speed of operation has been limited to some extent by the nut feeding portion of the apparatus. In particular, at very high speeds, the nuts will not drop into the openings of the rotating cracking unit, but rather they will tend to fly radially from the machine. Also, it is highly desirable that each nut be oriented in the cracking unit so that the cracking force is applied in the end to end direction, and with the above prior nutcracking apparatus, the orientation of the nuts is often disrupted as they fall into the cracking units, and the desired alignment of each nut in the cracking unit is not always maintained.

It is accordingly an object of the present invention to provide a high production nutcracking method and apparatus which effectively overcomes the above noted limitations in the speed of operation of applicant's prior apparatus.

It is a more particular object of the present invention to provide a nutcracking apparatus of the rotary turret type, and which has provision for effectively orienting the nuts at high speed, feeding the oriented nuts in succession at high speed to the individual cracking units of the rotating turret, and preserving the orientation of the nuts as they move from the feeding apparatus into the respective cracking units and to the location at which they are cracked.

These and other objects and advantages of the present invention are achieved in the embodiment illustrated herein by the provision of a method and apparatus which includes passing the upper run of a feed conveyor having a plurality of successive nut receiving receptacles, through the lower portion of a feed hopper, while singularizing and orienting the nuts into the receptacles, to thereby advance a plurality of oriented nuts individually in succession along a generally linear first path of travel. The advancing oriented nuts are then clampingly engaged in succession at the terminal end of the first path of travel by respective cracking units mounted on the rotating turret, and so as to preserve the orientation of the nuts. The nuts are thereby withdrawn from the linear first path of travel, and are thereafter conveyed along a curvilinear second path of travel, i.e., the circular path resulting from the rotation of the turret. A cracking force is applied to each nut at a point along the second path of travel downstream of the point at which the nuts are withdrawn from the linear first path of travel, and the cracked nuts continue to be held in the cracking units, until a predetermined release point along the second path of travel is reached.

In the preferred embodiment, the turret is located above the upper run of the feed conveyor, and the upper run is disposed generally tangent to the bottom portion of the circle defined by the rotation of the cracking units. Thus the nuts are effectively lifted from the feed conveyor by the cracking units, and the nuts are moved upwardly away from the feed conveyor prior to cracking.

The cracking units of the present invention include means for clampingly engaging the nuts while on the feed conveyor, and for retaining the nuts in their predetermined orientation as the cracking unit rotates through the cracking position and to the release point. Also, the cracking units preferably include means for applying a compressive stress to each nut immediately before and during the cracking operation.

The nuts are preferably singularized and oriented into the receptacles of the feed conveyor as the receptacles move through the feed hopper, by means of a deflecting plate positioned in the hopper above the advancing receptacles, and so as to laterally deflect the upper portion of each of any upstanding nuts disposed in each receptacle, and thereby laterally orient the nuts. Also, there is provided an ejecting arm positioned in the hopper for laterally ejecting any laterally oriented nuts in excess of one from each receptacle.

Some of the objects and advantages of the invention having been stated, others will appear as the description proceeds, when taken in connection with the accompanying drawings, in which FIG. 1 is a perspective view of a nutcracking apparatus embodying the features of the present invention;

FIG. 2 is a sectional front elevation view taken substantially along the line 2—2 of FIG. 1;

FIG. 3 is a fragmentary perspective view of the singularizing and orienting means associated with the feed conveyor of the present invention, and viewed in the direction of the arrow 3 in FIG. 2;

FIG. 4 is a sectional end view of the feed conveyor and lower portion of the hopper, and taken substantially along the line 4—4 of FIG. 2;

FIG. 5 is a perspective view of one of the nut transport elements of the feed conveyor;

FIG. 6 is a sectional top plan view of the deflecting arm of the singularizing and orienting means, with the overlying deflecting plate shown in dashed lines, and taken substantially along the line 6—6 of FIG. 4;

FIG. 7 is a sectional end view of the feed conveyor taken somewhat downstream of the line 4—4 of FIG. 2, and illustrating the manner in which the deflecting plate acts to orient the nuts in the advancing receptacles;

FIG. 8 is a fragmentary rear elevation view of the apparatus and illustrating the drive system for the turret and the feed conveyor;

FIG. 9 is a fragmentary sectional and partially schematic side elevation view of the upper portion of the turret of the present invention, and illustrating the structure of one of the cracking units;

FIG. 10 is a fragmentary front elevation view of the mounting plate and air control bushings of the apparatus and taken substantially along the line 10—10 of FIG. 9; and FIG. 11 is an enlarged fragmentary sectional view of the cracking hammer mounting structure of the present invention.

Referring more specifically to the drawings, a nutcracking apparatus embodying the features of the present invention is illustrated generally at 10 in FIG. 1. The apparatus includes a rectangular box-like frame comprising four vertical legs 12, 13, 14, 15, and a number of horizontal end and side braces interconnecting the legs. The upper horizontal end braces support a pair of bearing blocks 18, 19 (FIG. 9) which rotatably mounts a central shaft 20 which defines a horizontal central axis.

As best seen in FIG. 9, a turret 22 is fixedly mounted to the shaft 20 so as to be rotatable with the shaft about the central axis. The turret 22 comprises a plurality of elongate cracking units 24 which are circularly arranged about the shaft and supported by the end plates 25 and 26, and the intermediate plates 27, 28 and 29. There are sixteen cracking units in the illustrated embodiment and the units extend generally parallel to each other and to the central axis.

Each of the cracking units 24 comprises an anvil 32, a cracking hammer 34, and means mounting the anvil and cracking hammer in an axially aligned, opposed relationship to define a nut receiving opening therebetween. More particularly, the means for mounting the anvil includes a first air cylinder 35, a piston 36 slidably disposed within the cylinder, a piston rod 37 interconnecting the piston and the anvil, a first port 38 disposed adjacent the rearward end of the cylinder, and a second port 39 disposed adjacent the forward end of the cylinder. As will be apparent, movement of the piston results in a corresponding movement of the anvil, either forwardly toward the cracking hammer or rearwardly therefrom.

The means mounting the cracking hammer 34 includes a second air cylinder 42, with the cracking hammer being mounted for limited axial movement at the forward end of the cylinder 42. As best seen in FIG. 11, the cracking hammer 34 includes a rearwardly facing surface 34a and a forwardly facing shoulder 34b, and is mounted by an arrangement which includes a sleeve 43 at the forward end of the cylinder defining a forwardly facing shoulder 44, and an insert 45 which is fixed to the sleeve 43 and overlies the forward end of the cylinder 42 and defines a rearwardly facing shoulder 46. A pair of resilient O-rings 47 are disposed between the shoulders 34b and 47, and the cracking hammer 34 is axially movable the short distance between the two shoulders 44, 46 so as to compress the O-rings 47 in the manner which will be apparent in FIG. 11. In addition, there is provided a third port 48 adjacent the forward end of the cylinder 42, and a fourth port 49 which extends axially through the rearward end of the cylinder 42. Also, a free floating shuttle 50 is mounted within the air cylinder 42.

The forwardly facing or opposed faces of each of the anvil 32 and cracking hammer 34 include a conical front surface, such that the ends of a nut N are adapted to be partially received therein, note FIG. 9, to thereby facilitate the clamping engagement and retention of the nut in the manner hereinafter further described.

The control means for cyclically actuating the cracking units 24 includes the end plate 25 which is fixedly mounted to the shaft 20 of the turret, and which is disposed adjacent the radial plane defined by the rearward ends of the air cylinders 42. The inner face of the plate 25 is fixed to the adjacent end of each air cylinder, and the outer face is generally planar. The plate 25 includes four separate apertures 51, 52, 53, 54 extending therethrough for each cracking unit, and which communicate with respective ones of the four ports. Since there are a total of sixteen cracking units on the turret of the illustrated embodiment, the plate 25 includes a total of sixty-four apertures, with a set of circularly arranged apertures communicating with respective ones of each of the four ports. The four apertures 51a-54a for the cracking unit 24a are illustrated in FIG. 8, and it will be understood that the remaining cracking units have a like set of four apertures. These remaining apertures for the other cracking units are not shown in the drawings for clarity of illustration. Also for clarity of illustration, FIG. 9 illustrates the four apertures as being radially aligned, which is not totally correct since the aperture 52 is not in radial alignment, but is advanced 22.5°, note FIG. 10. Three air lines 57, 58, 59 extend from the inner side of the apertures 51, 52, 52, respectively, to the first, second, and third ports for each cracking unit. The fourth aperture 54 communicates directly with the port 49 at the rearward end of the air cylinder 42.

A circular plate 66 is fixed to the frame so as to overlie the outer face of the plate 25, and a felt pad 67 is interposed between the two plates 66 and 25. A mounting plate 68 overlies and is fixed to the plate 66, and a total of five bushings 61, 62, 63, 64, 65 are fixedly carried on the frame by a mounting plate 68, and so that the bushings communicate with the planar outer surface of the end plate 25 through aligned openings in the felt pad 67, which does not rotate. The first or nut pick-up bushing 61 is positioned at a radial location so as to sequentially communicate with each of the apertures 51 as the turret rotates. Similarly, the second or nut stressing bushing 62 is positioned so as to sequentially communicate with each of the same apertures 51 for a second time at a point downstream of the first bushing 61. The third or cracking bushing 63 sequentially communicates with each of the apertures 54, the fourth or nut release bushing 64 sequentially communicates with each of the apertures 52, and the fifth or reset bushing 65 communicates with each of the apertures 53. It will be apparent that the felt pad 67 functions as a seal between the plates 66 and 25. Also, each bushing communicates with a separate air line 61a-65a, respectively, and with each such line extending through an air supply bottle 70. The lines continue from the bottle through one of the air pressure gauges 71 (FIG. 1), and control regulators 72, mounted at the front end of the apparatus, and then to a common manifold line (not shown). The manifold line preferably includes an air oiler 73 and an air filter 74, and leads to a suitable air supply (not shown).

The nutcracking apparatus further incorporates means for removing the shell fragments resulting from the cracking operation, as well as for collecting and separating any whole nuts which may be dropped in the transfer from the feed conveyor to the cracking unit, or in cracking process. More particularly, the apparatus includes a housing 78 which opens toward the nut receiving openings of the cracking units along the right side of the turret as seen in FIG. 2, and which corresponds to the area in which cracking occurs as hereinafter further described. A vacuum line 79 is connected to the rear of the housing, which results in a flow of air around the cracking units and into the housing 78, to thereby carry away the broken shell fragments.

The vacuum system further includes a lower collector which is disposed below the cracking area, and which is designed to separate any whole nuts which may be dropped while being fed into the cracking units, from any broken commingled shell fragments which are not caught and collected by the upper vacuum housing. The lower collector includes an adjustably inclined, metal bottom wall 80a which cooperates with a fixed wall 80b to define a nozzle 80c therebetween. A second vacuum 81 is connected to the chamber behind the walls 80a and 80b, whereby the shell fragments moving down the wall 80a are drawn through the nozzle and removed, whereas the relatively heavy nuts move past the nozzle for discharge through an opening 82 in the bottom of the apparatus. A laterally directed nut discharge chute 83 (FIG. 2) is provided on the apparatus for conveying the cracked nuts to a suitable container or conveyor (not shown) adjacent the rear end of the apparatus.

The apparatus of the present invention further includes means for advancing and delivering a plurality of nuts individually in succession along a linear path of travel to the rotating turret 22. This nut delivering means includes a primary hopper 85 for storing a relatively large quantity of the nuts to be cracked. An endless feed conveyor 86 is mounted for movement about the shafts 88, 89, and includes an upper run which extends through the lower portion of the hopper 85 and along an upwardly inclined path of travel to a delivery point adjacent the turret. The endless conveyor 86 includes a pair of sprockets 90, 91 mounted respectively on the shafts 88, 89, and a drive chain 92 (FIG. 4) entrained about the sprockets.

A plurality of block-like nut transport elements 95 are mounted in succession along the drive chain 92. Each element includes parallel opposite sides 96, 97, parallel opposite ends 98, 99, and top and bottom faces (not numbered). A generally semi-cylindrical receptacle 102 extends laterally across the upper face of the element, and so as to communicate with both sides 96, 97 thereof. By design, each receptacle 102 is sized to supportingly receive a single nut to be cracked which is oriented with its end to end direction extending axially along the receptacle. Each element 95 further includes a longitudinal channel 103 in the bottom face for receiving the drive chain 92, and a pair of transverse pins 104 (FIG. 4) for interconnecting the element to the chain. Further, the element 95 includes a slot 105 which extends longitudinally along the full length of the side 97, and which is disposed parallel to the bottom face of the element. The slot 105 extends laterally a portion of the distance across the element, and communicates with the receptacle 102 in the manner best seen in FIG. 5. The portion 106 of the top face forwardly of receptacle will be seen to be inclined downwardly, so that the portion 107 rearwardly of the receptacle in effect protrudes upwardly so as to catch the nuts in the hopper and knock them into the receptacle.

The conveyor 86 is powered by the motor 108 and drive chain 109, which also drives the turret 22 in the manner seen in FIG. 9, and such that the transport elements and thus the nuts move from the hopper tangentially past the circle defined by the rotating cracking units, at a speed corresponding to such rotational speed.

The bottom of the hopper 85 is defined in part by a pair of rectangular support members 110, 111 and a bottom plate 112, noted FIG. 4. A rectangular channel is thereby defined between the members 110, 111, along which the elements move in succession, note FIGS. 3 and 4. The member 110 is disposed at an elevation somewhat above the member 111, and such that the side 114 of the member 110 serves to fully cover and close the adjacent end of the receptacles 102 moving therealong. The top of the member 111 is disposed at an elevation generally corresponding to the bottom of the receptacles 102.

The hopper 85 includes singularizing and orienting means to insure that any nuts in excess of one are removed from the receptacle 102 of each nut transport element, and that each nut is oriented with its end to end direction extending axially along the receptacle. This singularizing and orienting means includes a deflecting plate 118 which is designed for laterally deflecting the upper portion of each of any upstanding nuts disposed in each receptacle toward the side 96 of the element, as the element moves through the hopper, to thereby laterally orient the nuts. The plate 118 has a forward edge 119, and a length sufficient to overlie the path of several nut transport elements. In addition, the plate 118 is mounted in the hopper so as to overlie the path of the nut transport elements and such that the forward edge 119 extends diagonally across such path. The plate 118 is pivotally connected adjacent its upstream end for pivotal movement about a horizontal axis defined by the anchoring pin 120, and such that the plate may be lifted upwardly from the elements 95 in the event a foreign object, such as a rock, enters the hopper and moves between the elements 95 and the plate 118. The pin 120 is in turn mounted to the bracket 121 so as to permit its elevation to be adjusted, and thus permit the elevation of the upstream end of the plate 118 to be adjusted.

The singularizing and orienting means of the apparatus further includes means for laterally ejecting any laterally oriented nuts in excess of one from each receptacle. This ejecting means comprises an arm 124, which is mounted in the hopper so that the arm extends a predetermined lateral distance into the slot 105 of each advancing element, to thereby deflect each nut therein which is adjacent the side 97 and so that it moves toward the side 96. The arm 124 is adjustably mounted by means of the mounting plate 125, and is typically positioned to extend into the slot 105 so that the distance between the innermost portion of the arm and the side 96 corresponds to the average length of the nuts being processed. Thus in the event two relatively small nuts are positioned in any receptacle in end to end alignment, the arm will serve to eject the one closest to the side 96. It will also be noted from FIG. 6 that the elongate deflecting plate 118 overlies the operative portion of the ejecting arm 124, and thus serves to prevent nuts from lifting upwardly from the associated receptacle 102 upon being contacted by the arms 124.

The hopper also mounts an upwardly inclined guide surface 130 which is positioned on the support member 111 along the side 96 of the elements 95, and downstream of the deflecting edge 119 of the plate 118 and the ejecting arm 124. The guide surface 130 is positioned so as to contact that portion of any nut extending laterally from its supporting receptacle 102 on the side 96, and acts to move the nut back into the receptacle.

It is preferable that the quantity of the nuts in the hopper 85 be controlled, since an unduly large quantity, and the resulting weight, may cause the singularizing and orienting means to ineffectually operative. In order to maintain a controlled quantity in the hopper, there is provided a secondary hopper 132 disposed adjacent to the primary hopper 85, and a vertically adjustable gate 134 interconnects the two hoppers. Thus the position of the gate 134 between the hoppers limits the elevation and thus the quantity of nuts in the primary hopper 85.

To describe the operation of the apparatus, it will be understood that the motor 108 acts to rotate the turret 22 about the central axis, and to advance the conveyor 86 so that the upper run moves toward the turret at a speed corresponding to the rotational speed of the cracking units 24. The nut transport elements 95 thereby move in succession through the hopper 85, and the nuts therein are received in the receptacles 102, and singularized and oriented by contact with the plate 118, arm 124, and guide surface 130 in the manner described above. The nuts are thereby effectively individually received in the respective receptacles 102, and oriented with their end to end direction being disposed horizontally and perpendicular to the direction of movement of the upper run of the conveyor.

By design, the nuts are moved in succession to the openings between the anvil 32 and cracking hammer 34 as each cracking unit passes a nut loading or pickup position which is located at about the 210 degree point of the circle defined by the rotating cracking units, i.e., 30 degrees past the bottom dead center position. At this point, the bushing 61 comes into alignment with the associated aperture 51 in the plate 25, and pressurized air passes through the line 57 to the first port 38 of the cracking unit. The piston 36 and anvil 32 are thereby moved forwardly, and such that the anvil operatively engages one end of the nut N in the opening, and with the force acting through the nut to move the cracking hammer 34 rearwardly into contact with the shoulder 44. The anvil and cracking hammer thereby serve to clampingly engage and retain the nut in an end to end alignment therebetween, and to lift the nut from its receptacle on the feed conveyor 86. The frictional contact between the piston 36 and the walls of the air cylinder 35 serve to maintain the forward axial position of the anvil during rotational movement of the cracking unit upwardly and away from the conveyor.

The nut is then advanced along a curvilinear path of travel, i.e., the circle defined by the rotating cracking units, and to a nut stressing location, which is located at about the 273 degree point. At this location, the bushing 62 comes into alignment with the aperture 51, and air again enters the first port 38 to compressively stress the retained nut. Immediately thereafter, e.g., at about the 283° point, the bushing 63 comes into alignment with the aperture 54, and high pressure air is injected through the aperture 54 and into the air cylinder 42, such that the shuttle 50 is thrust forwardly along the cylinder and impacts against the rear side 34a of the cracking hammer 34, causing the cracking hammer to sharply advance a short distance forwardly against the O-rings 47 and thereby crack the nut. The air in front of the advancing shuttle enters the line 59, which is of relatively large diameter to accommodate the entering air without an undue build-up of pressure. Also, some of this entering air is dissipated into the felt pad 67 through the aperture 53. Most of the loose shell fragments resulting from the cracking operation are drawn off through the housing 78 by the vacuum line 79. Further, the cracking operation preferably occurs while the nut remains under compressive stress resulting from the communication of the bushing 62 with the aperture 51 as described above.

The cracked nut remains supported between the anvil and cracking hammer after the cracking operation, and is carried to a release point, which is preferably positioned at about 45° beyond the top dead center position of the turret. At this point, the bushing 64 comes into alignment with the associated aperture 52, causing air to enter the line 58 and second port 39, and the piston and anvil are moved rearwardly. The released nut then falls to the laterally directed discharge chute 83.

As the final step, the bushing 65 comes into alignment with the aperture 53 at a point downstream of the release point, causing air to enter the aperture and the line 59, and the shuttle 50 to return to its rearward position. The cycle may then be repeated as the cracking units move through the loading position to receive another nut from an aligned receptacle.

As noted above, the regulators 72 permit the pressure in each of the lines 61a–65a to be adjustably controlled. As typical examples, the pressure in the line 61a leading to the nut pick-up bushing 61a is relatively high, for example, about 30 psi, to assure proper movement of the piston 36 and anvil 34. The pressure in the nut stressing line 62a is typically about 8 psi, and the pressure in the cracking line 63a is typically about 33 psi. The release pressure in line 64a typically about 30 psi, and the pressure in the reset line 65a is typically about 8 psi.

In the drawings and specification, there has been set forth a preferred embodiment of the invention, and although specific terms are employed, they are used in a generic and descriptive sense only and not for purposes of limitation.

That which is claimed is:

1. A method of cracking nuts at a high production rate and comprising the steps of
    advancing a plurality of nuts in individual receptacles in succession along a first linear path of travel, with at least substantially all of the advancing nuts being disposed in a predetermined orientation,
    removing the advancing nuts in succession from the first path of travel at the terminal end thereof and advancing the removed nuts in succession along a generally curvilinear second path of travel, with the second path of travel defining a circle which is substantially tangent to and disposed above the first path of travel, and such that the nuts continue to advance in the same general direction and are lifted as they move from the first path of travel into the second path of travel, and including clampingly engaging each nut during its removal from the first path of travel and advance along the second path of travel so as to preserve the predetermined orientation of each nut, and
    imparting a cracking force to each nut while being advanced along the second path of travel.

2. The method as defined in claim 1 wherein the step of imparting a cracking force occurs at a predetermined location along the second path of travel, and wherein the second path of travel continues beyond such predetermined location to a predetermined release point.

3. The method as defined in claim 2 comprising the further step of drawing a partial vacuum adjacent the predetermined location along the second path of travel to remove at least a substantial portion of the shell fragments resulting from the cracking step.

4. The method as defined in any one of claims 1–3 comparing the further step of separating whole nuts which are dropped during the removing step, from at least a substantial portion of any commingled shell fragments resulting from the cracking step.

5. The method as defined in claim 2 wherein the predetermined orientation of the nuts is defined by the nuts being oriented with their end to end direction being disposed horizontally and perpendicular to the direction of the first path of travel, and wherein the nuts are clampingly engaged in the end to end direction and the cracking force is applied in the end to end direction.

6. The method as defined in claim 5 comprising the further step of applying a stressing force to each nut in the end to end direction while being advanced along the second path of travel, with the stressing force being applied immediately before and at the time the cracking force is imparted.

7. The method as defined in claim 1 wherein the nuts are advanced along the first and second paths of travel at corresponding speeds.

8. A method of cracking nuts at a high production rate, and comprising the steps of advancing a plurality of nuts in individual receptacles in succession along a generally linear first path of travel, while orienting each nut so that its end to end direction is disposed horizontally and perpendicular to the direction of the path of travel, lifting each of the nuts in succession from the first path of travel and advancing the nuts in succession along a curvilinear second path of travel which defines a circle disposed tangent to the first path of travel, and including applying a clamping force at the opposite ends of each oriented nut during lifting from the first path of travel and advance along the second path of travel so as to preserve the orientation of each nut, applying a stressing force to each nut at a predetermined location along the second path of travel, with the stressing force being applied in the end to end direction of each oriented nut, imparting a cracking force to each nut at a predetermined location along the second path of travel and while the stressing force is being applied, and with the cracking force being applied in the end to end direction of each oriented nut, and continuing to advance the cracked nuts in succession along the second path of travel to a release point located downstream of the predetermined cracking location, and then removing the clamping force to release the cracked nuts.

9. The method as defined in claim 8 wherein the step of advancing the nuts along the first path of travel includes directing a plurality of nut receiving receptacles in succession through a hopper containing a plurality of nuts, with the receptacles being upwardly open, and while singularizing and orienting the nuts into the receptacles as they move through the hopper.

* * * * *